Patented Oct. 28, 1930

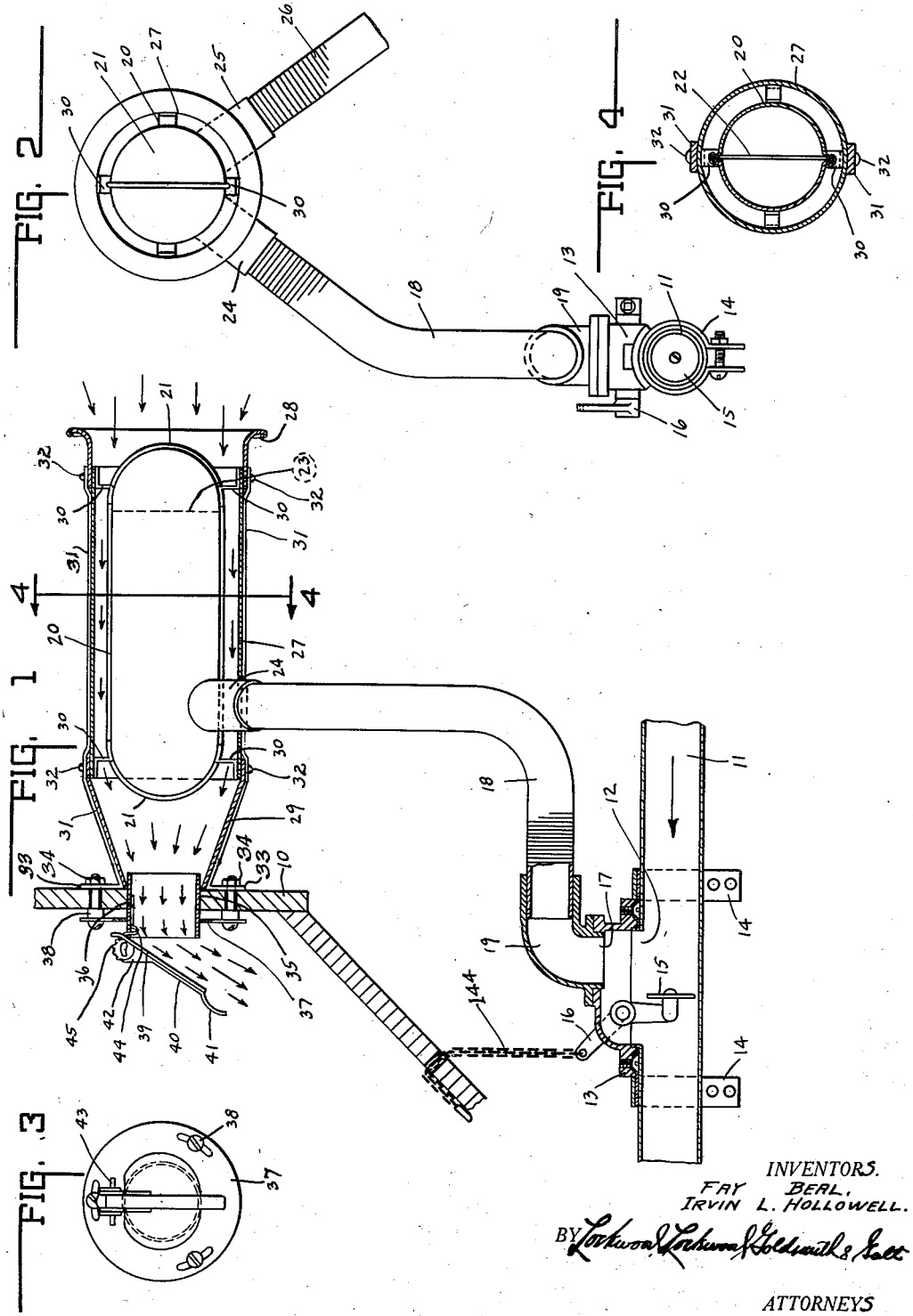

1,779,406

UNITED STATES PATENT OFFICE

FAY BEAL AND IRVIN L. HOLLOWELL, OF KOKOMO, INDIANA, ASSIGNORS, BY MESNE ASSIGNMENTS, TO KINGSTON PRODUCTS CORPORATION

AUTOMOBILE HEATER

Application filed July 30, 1927. Serial No. 209,591.

This invention relates to a hot air heater for automobiles and the like.

The chief object of the invention is to provide an automobile heater which is of the general character having a chamber or passage thru which the exhaust gases of the automobile engine pass, associated with which is an air conducting passage discharging into the automobile or vehicle compartment, the passage of gas thru both passages being controlled by individual valves and the air, in its passage, abstracting heat from the aforesaid gas passage.

The chief feature of the invention consists in the particular type of heater construction employed.

The full nature of the invention will be understood from the accompanying drawings and the following description and claims:

In the drawings Fig. 1 is a semi-diagrammatic elevational view of the invention with parts broken away and with other parts in section illustrating the invention in detail and its association with necessary parts of an automobile. Fig. 2 is a front view thereof. Fig. 3 is a rear view of the heater air control valve. Fig. 4 is a transverse section of the heater taken on line 4—4 of Fig. 1 in the direction of the arrows.

In the drawings 10 indicates a dash of an automobile. 11 an exhaust pipe from the engine thereof, having an opening 12 therein which is covered by a saddle 13 clampingly mounted as at 14 so as to constitute a by-pass from the exhaust pipe. Pivotally mounted in the body portion of the saddle is a valve 15 counter-balanced and controlled by lever arm 16, which controls the outlet 17. From the saddle a flexible conduit 18 communicates with the outlet 17 by means of an elbow 19.

A heater passage for the exhaust gases comprises a chamber having a circular exterior 20 and hemispherical ends 21, in which is mounted a partition 22 terminating at 23 for forming an elongated return bend passage. Near one end there is positioned an inlet 24 and an outlet 25, each communicating with one end of the return bend passage thru the heater. Inlet 24 receives the other end of conduit 18 and outlet 25 discharges the exhaust gas after it has passed thru the return bend passage by way of the flexible conduit 26 leading downwardly and rearwardly thru the body of the car.

Peripherally enclosing the casing 20—21 is a cylindrical casing 27 having a flared bellmouth 28 and a tapered or conical discharge 29. The inlet and outlets 24 and 25 extend therethru as shown in Figs. 1 and 2. The exhaust gas passage or chamber 20—21 is maintained in spaced relation within the casing 27 by the spacers in the form of spacing clips 30, which are rigidly secured to the casing 27, together with the main supporting bracket members 31 by suitable securing means such as the rivets 32. The brackets 31 constitute elongated strips having angular ends 33 which are rigidly mounted on the dash 10 by suitable means such as the nut and bolt 34.

The dash is provided with an opening 35 concentric with the discharge end of the conical portion 29 of the casing 27. Suitably mounted within the aperture 35 is a passage-forming member 36 in the form of a sleeve supported by a plate 37 suitably secured to said dash as at 38. Pivotally supported by the sleeve 36 is a valve member 39 having a strap 40 terminating in a finger piece 41, the strap 40 being extended oppositely at 42 to form a hinge construction, pin 43 cooperating therewith. A spring 44 associated with a ratchet wheel arrangement 45 serves to maintain the shutter or valve member 39 in the adjusted position.

The operation of the device is as follows:

When it is desired to ventilate the vehicle compartment, valve 39 is positioned as shown in Fig. 3. The air passes through the passage 27 and discharges into the compartment. When it is desired to supply heated air to the vehicle compartment, the valve 15 is adjusted by chain 144 and positioned as shown in Fig. 1 valve 40 is adjustably positioned by suitably controlled means indicated at 42 to 45 inclusive, whereupon a considerable portion of the exhaust gas is by-passed to and through the heater by reason of the valve 15 serving as a deflector. The exhaust gas passes by way of conduit 18 thru the exhaust gas passage-forming chamber 20—21 and thence to the atmosphere by the downwardly and rearwardly leading flexible conduit 26. The air passing thru passage 27 and over the exhaust gas heated chamber discharges thru sleeve 36 when valve 39 is positioned as shown in Fig. 3 and is in a heated condition by reason of the heated exhaust gas chamber.

The invention claimed is:

1. In a vehicle, the combination with an engine exhaust pipe, an apertured support included in the vehicle, a valve controlled heated air discharge mounted therein, and an air supplying conduit directly connected thereto and communicating therewith, of an exhaust gas air-heating chamber mounted within said conduit, a valve controlled deflecting cut out device included in said pipe, a connection between said cut out device and chamber for supplying exhaust gas thereto and a discharge from said chamber.

2. In a vehicle the combination with an engine exhaust pipe, an apertured support included in the vehicle a valve controlled heated air discharge mounted therein, and an air supplying conduit directly connected thereto and communicating therewith, of an exhaust gas air-heating chamber mounted within said conduit, a cut out included in said pipe, a combination deflector and valve controlling said cut out, and a control for said last mentioned valve having a portion juxtapositioned adjacent the discharge, a connection between said cut out and said chamber for supplying deflected exhaust gas thereto, and a discharge from said chamber.

3. A device as defined by claim 1, characterized by the conduit including a flared mouth at its free end, and a conical opposite supported end.

In witness whereof, we have hereunto affixed our signatures.

FAY BEAL.
IRVIN L. HOLLOWELL.